US007778603B2

(12) United States Patent
Palin et al.

(10) Patent No.: US 7,778,603 B2
(45) Date of Patent: Aug. 17, 2010

(54) BANDWIDTH CONSERVATION BY REALLOCATING UNUSED TIME SCHEDULED FOR A RADIO TO ANOTHER RADIO

(75) Inventors: Arto Palin, Viiala (FI); Jukka Reunamäki, Tampere (FI); Jani Okker, Tampere (FI); Jussi Ylanen, Lempäälä (FI); Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 825 days.

(21) Appl. No.: 11/553,102

(22) Filed: Oct. 26, 2006

(65) Prior Publication Data

US 2008/0101296 A1 May 1, 2008

(51) Int. Cl.
*H04B 1/00* (2006.01)
(52) U.S. Cl. .................. 455/41.2; 455/67.11; 455/78; 455/420; 455/512; 455/552.1; 370/311; 370/328; 370/344
(58) Field of Classification Search ................. 370/338, 370/311, 328, 344; 455/41.2, 552.1, 553.1, 455/67.11, 78, 420, 512
See application file for complete search history.

(56) References Cited

U.S. PATENT DOCUMENTS

| 2001/0010689 A1* | 8/2001 | Awater et al. ............... 370/344 |
| 2003/0125019 A1* | 7/2003 | Bajikar ....................... 455/420 |
| 2004/0048577 A1* | 3/2004 | Godfrey et al. ........... 455/67.11 |
| 2004/0192222 A1* | 9/2004 | Vaisanen et al. ............... 455/78 |
| 2005/0169201 A1* | 8/2005 | Huylebroeck ............... 370/311 |
| 2005/0192048 A1* | 9/2005 | Bridgelall ................ 455/553.1 |
| 2005/0276241 A1* | 12/2005 | Kamerman et al. ......... 370/328 |
| 2006/0030266 A1* | 2/2006 | Desai et al. ................ 455/41.2 |
| 2006/0194600 A1* | 8/2006 | Palin et al. ................... 455/512 |
| 2006/0205401 A1 | 9/2006 | Palin et al. |

(Continued)

FOREIGN PATENT DOCUMENTS

EP   1 626 541 A3   2/2006

(Continued)

OTHER PUBLICATIONS

IEEE Computer Society: "IEEE 802.15.2: Part15.2—Coexistence of Wireless Personal Area Networks with Other Wireless Devices Operating in Unlicensed Frequency Bands" Internet Citation, [Online]: Aug. 28, 2003, XP002419622.

(Continued)

*Primary Examiner*—William D Cumming
(74) *Attorney, Agent, or Firm*—Locke Lord Bissell & Liddell, LLP

(57) ABSTRACT

A system for managing the operation of a plurality of radio modems contained within the same wireless communication device. The radio modems may be managed so that simultaneous communication involving two or more radio modems utilizing conflicting wireless communication mediums may be avoided. More specifically, a multiradio controller may identify when scheduled communication time in a radio modem using a more dominant, or high priority, wireless communication medium will in actually go unused, and may reallocate some or all of the now available scheduled time to radio modems using a lower priority wireless communication medium that have messages to transact.

20 Claims, 22 Drawing Sheets

U.S. PATENT DOCUMENTS

| | | | |
|---|---|---|---|
| 2006/0292986 A1* | 12/2006 | Bitran et al. | 455/41.2 |
| 2007/0021066 A1* | 1/2007 | Dravida et al. | 455/41.2 |
| 2007/0066222 A1* | 3/2007 | Tao et al. | 455/41.2 |
| 2007/0238482 A1* | 10/2007 | Rayzman et al. | 455/552.1 |
| 2008/0259837 A1* | 10/2008 | Thoukydides | 370/311 |

FOREIGN PATENT DOCUMENTS

| | | |
|---|---|---|
| WO | 03/105418 A3 | 12/2003 |

OTHER PUBLICATIONS

Chiasserini et al: "Coexistence mechanisms for interference mitigation between IEEE 802.11 WLANs and Bluetooth" Proceedings IEEE INFOCOM 2002. The Conference on Computer Communications. $21^{st}$ Annual Joint Conference of the IEEE Computer and Communications Societies. New York, NY, Jun. 23-27, 2002, Proceedings IEEE INFOCOM. The Conference on Computer Communica, vol. 1 of 3. Conf. 21, Jun. 23, 2002, pp. 590-598, XP010593620.

* cited by examiner

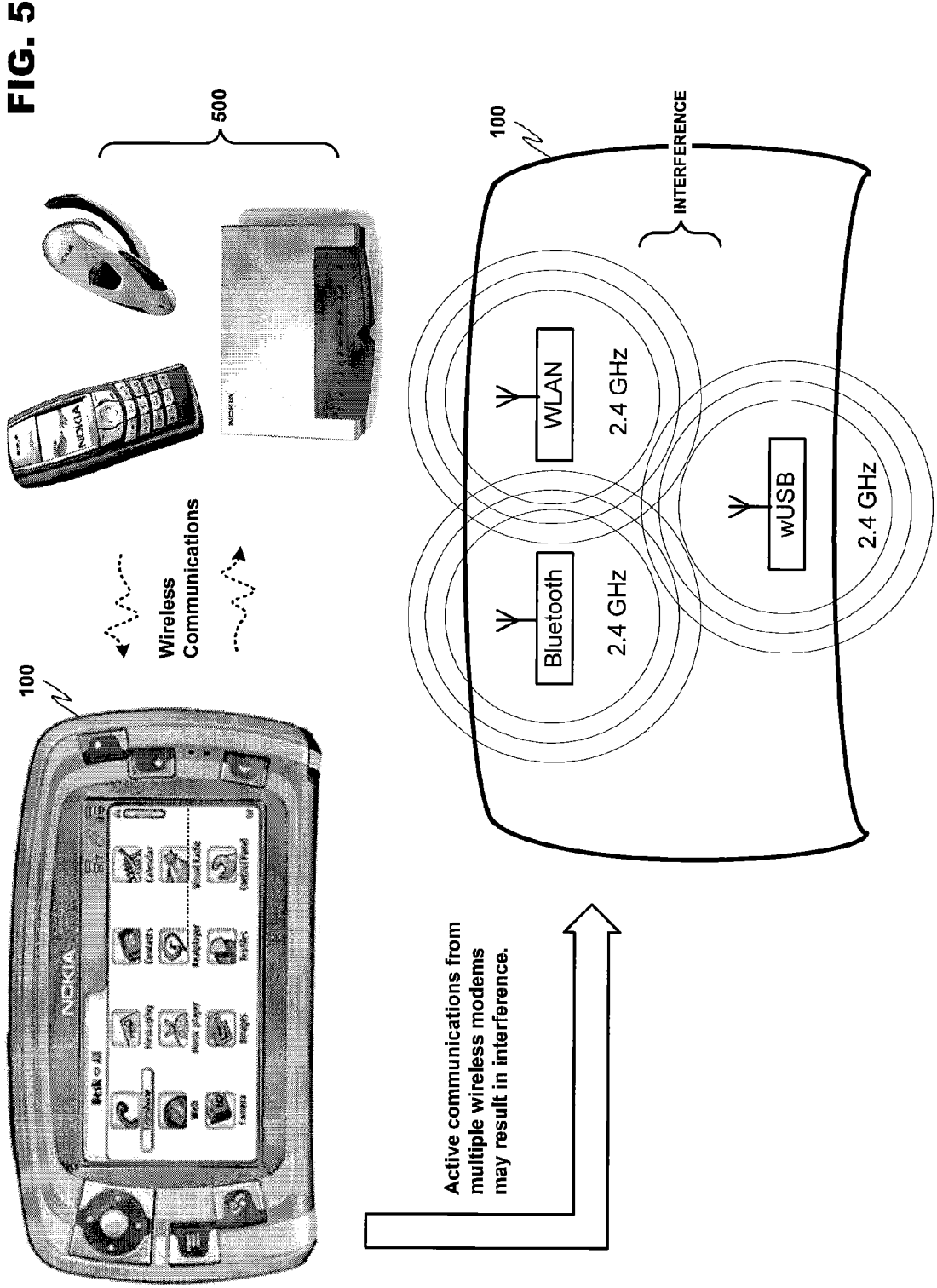

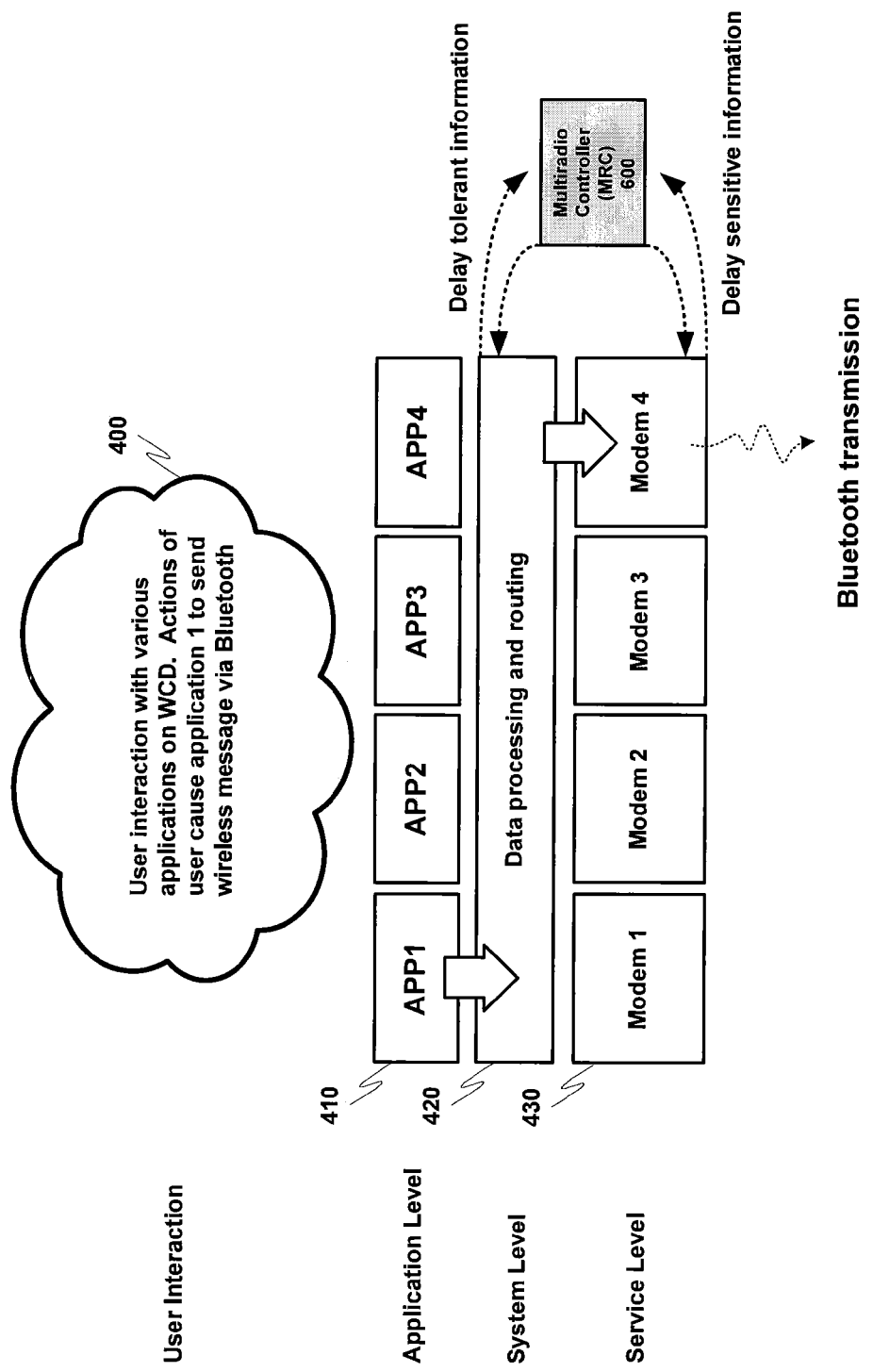

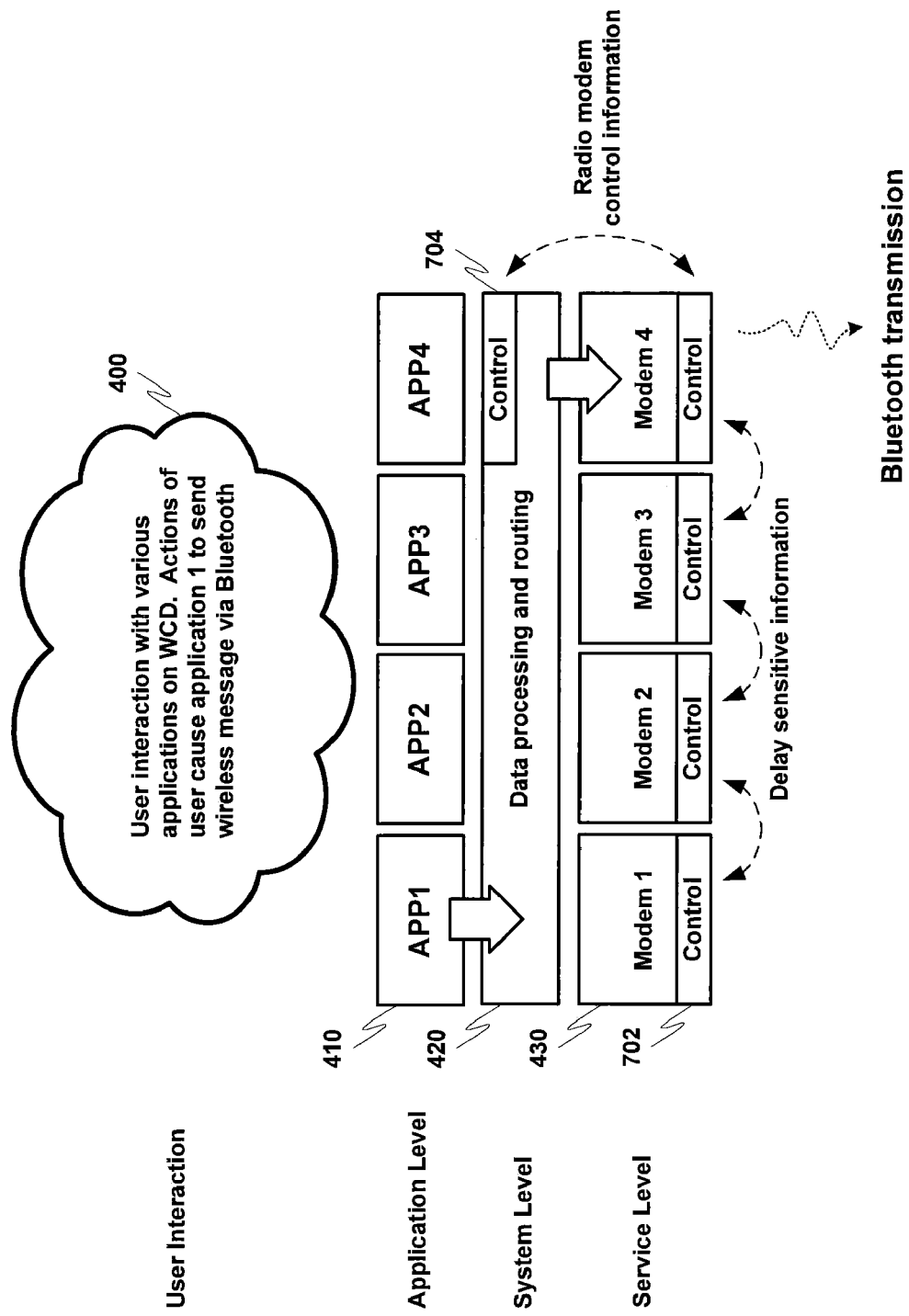

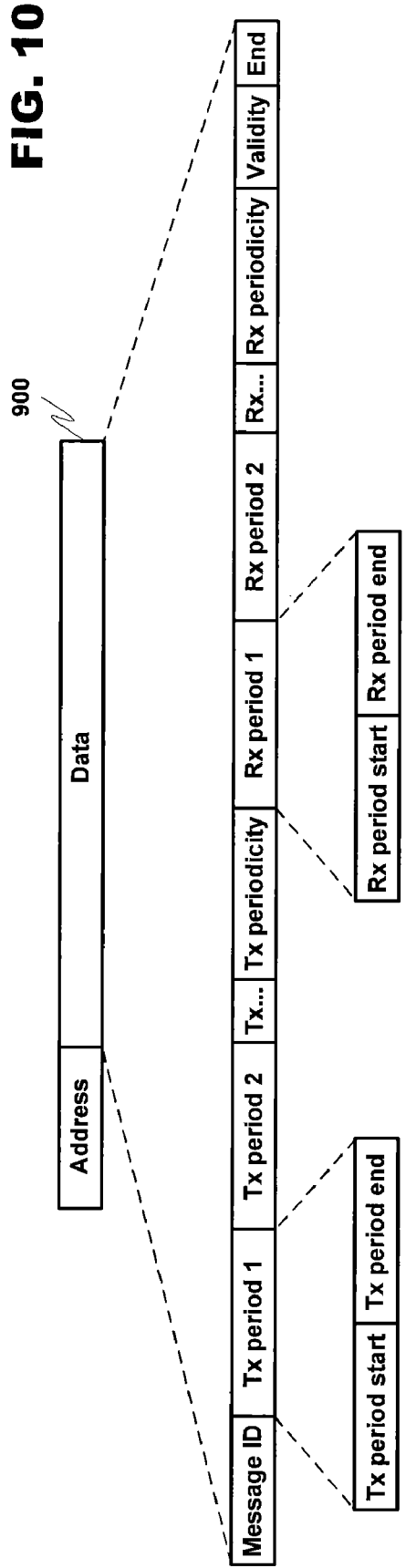

FIG. 11A
BANDWIDTH MANAGEMENT SYSTEM WITHOUT APPLICATION OF DYNAMIC BANDWIDTH CONSERVATION 1100
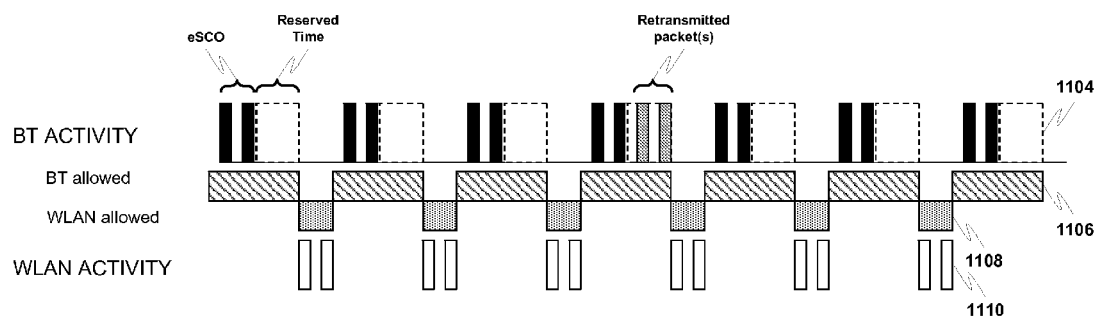
BANDWIDTH MANAGEMENT SYSTEM INCLUDING DYNAMIC BANDWIDTH CONSERVATION 1102
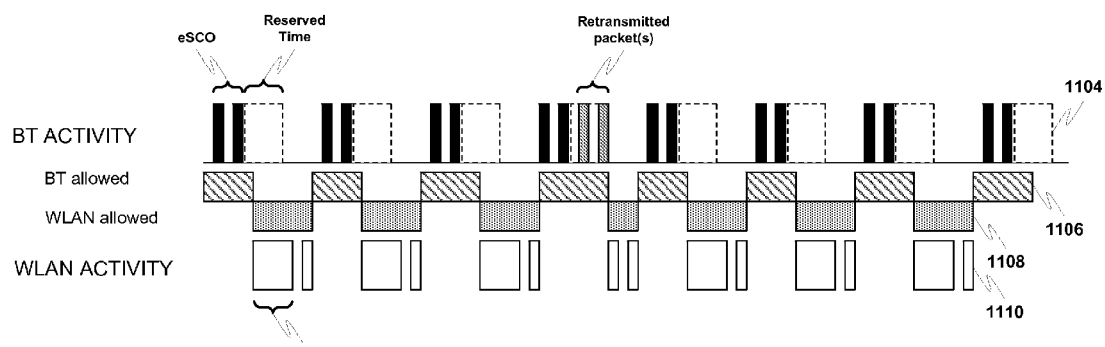
Dynamic conservation makes time available for WLAN if not used by BT

FIG. 11B
BANDWIDTH MANAGEMENT SYSTEM WITHOUT APPLICATION OF DYNAMIC BANDWIDTH CONSERVATION 1112
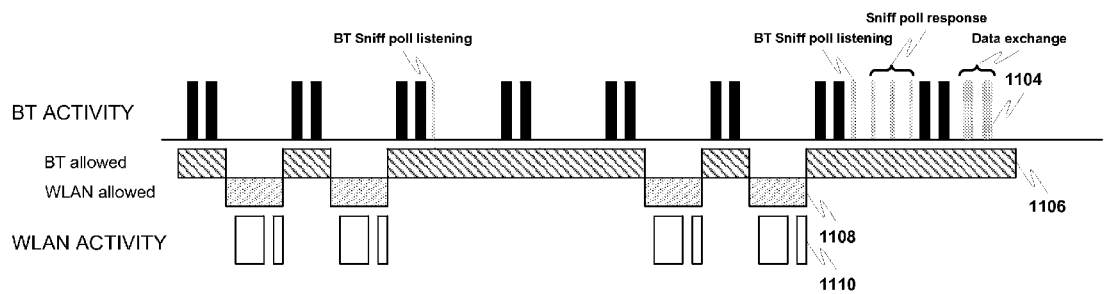
BANDWIDTH MANAGEMENT SYSTEM INCLUDING DYNAMIC BANDWIDTH CONSERVATION 1114
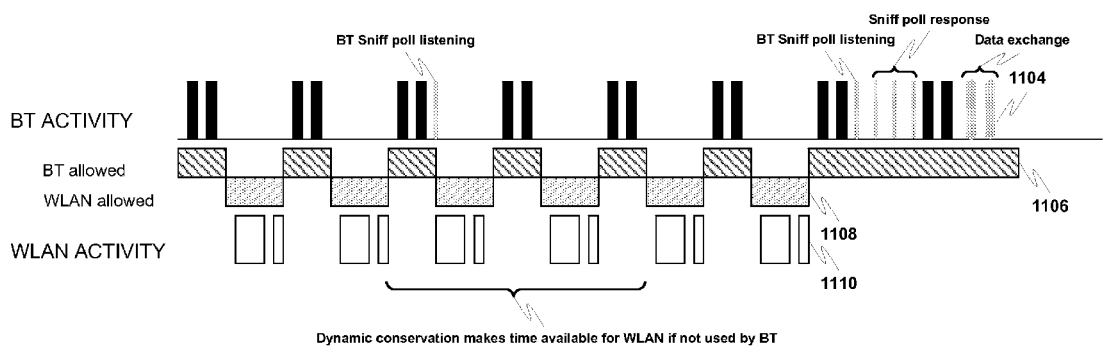
Dynamic conservation makes time available for WLAN if not used by BT

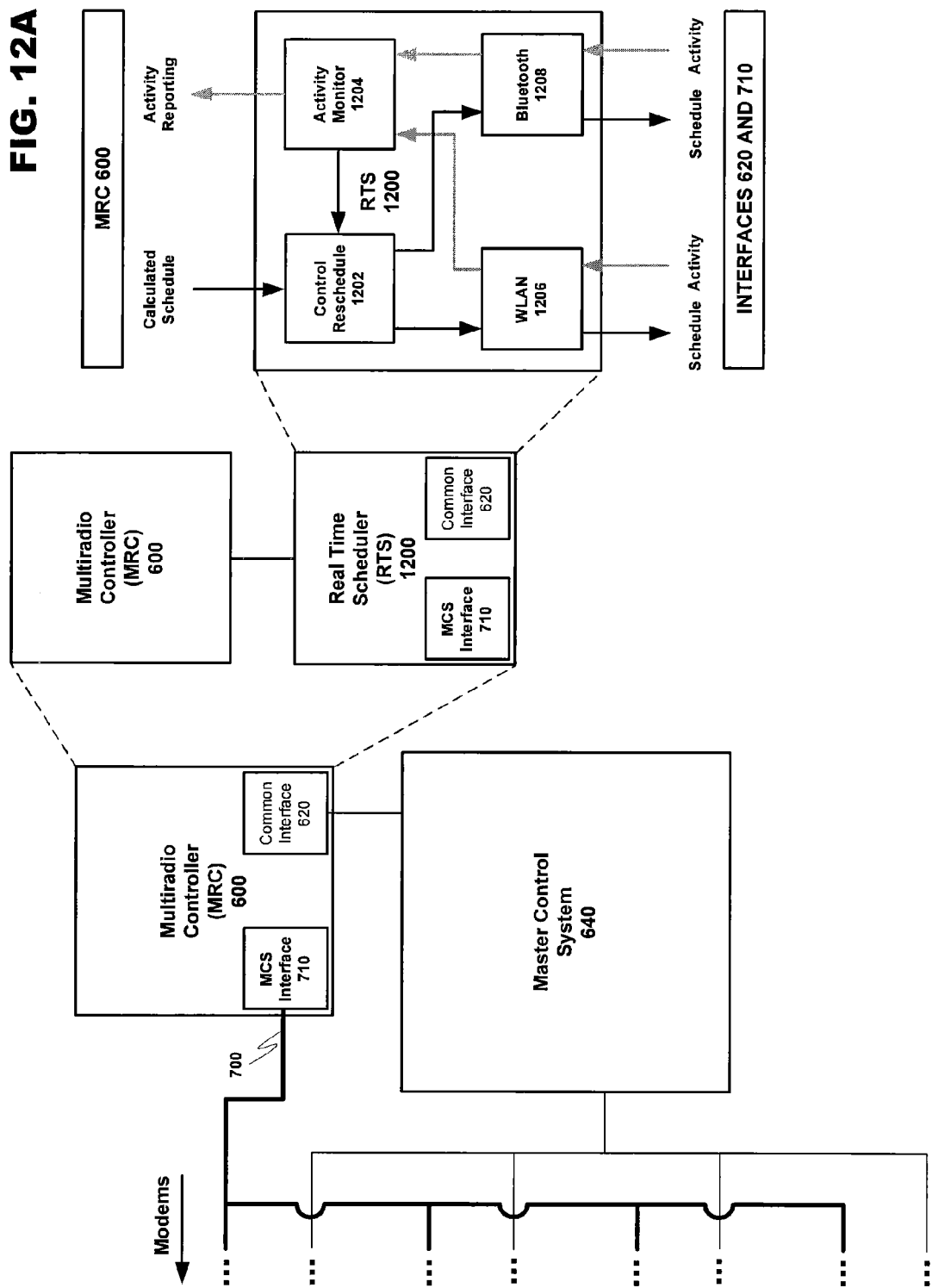

BANDWIDTH CONSERVATION BY REALLOCATING UNUSED TIME SCHEDULED FOR A RADIO TO ANOTHER RADIO

BACKGROUND OF INVENTION

1. Field of Invention

The present invention relates to a system for managing multiple radio modems imbedded in a wireless communication device, and more specifically, to a multiradio control system for scheduling a plurality of radio modems, wherein the multiradio control system may reallocate unused bandwidth scheduled for a high priority radio modem to other radio modems.

2. Description of Prior Art

Modem society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1 G) analog cellular telephones that provided baseline voice communication, to modem digital cellular telephones. GSM is an example of a widely employed 2 G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near Field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and NFC resources also often include multiple mediums for each category. This allows a communication device to flexibly adjust to its surroundings, for example, communicating both with a WLAN access point and a Bluetooth™ communication accessory, possibly at the same time.

Given the large array communication features that may be compiled into a single device, it is foreseeable that a user will need to employ a WCD to its full potential when replacing other productivity related devices. For example, a user may use a high powered WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

A system including a management strategy for regulating possibly conflicting wireless communication mediums may help to avoid interference and data loss. However, the regulation of communication mediums may, in some cases, result in other difficulties. Some wireless communication mediums do not have inherently efficient communication protocols. As a result, a radio modem utilizing a high priority wireless communication medium may have time reserved for possible transactions even though no active communication is currently occurring. Communication resources would therefore go unused, impacting the overall efficiency and reducing the communication speed of the WCD. The negative impact of this time waste is especially felt when the unused bandwidth could have been used by other active radio modems.

What is therefore needed is a management system for regulating radio modems utilizing possibly conflicting wireless communication mediums that further includes the ability to identify and reallocate previously scheduled, but actually unnecessary, bandwidth. More specifically, the system should include the ability to identify an actual requirement to transact information vs. scheduled communication time created due to a standard protocol, and in the case of an excess of scheduled time, be able to reallocate the unused scheduled time to a lower priority communication medium having an actual requirement to transact information.

SUMMARY OF INVENTION

The present invention includes at least a method, device, module, computer program and system for managing the operation of a plurality of radio modems contained within the same WCD. The radio modems may be managed so that simultaneous communication involving two or more radio modems utilizing conflicting wireless communication mediums may be avoided. Further, the present invention may identify when scheduled communication time in a radio modem using a more dominant, or high priority, wireless communication medium will in actually go unused, and may reallocate some or all of the now available scheduled time to radio modems using a lower priority wireless communication medium that have messages to transact.

In at least one embodiment of the present invention, signals related to a radio modem operating with the more dominant or high priority wireless communication medium may be monitored. These signals may dictate operation of the radio modem in a master (server) or slave (client) mode. As a master, communication signals from other resources within the WCD may dictate the transmission requirements of a radio modem utilizing a high priority wireless communication medium. For example, system level or application level requirements may be interpreted to determine when previously scheduled time periods will not be required. This "free" time may then be reallocated to other lower priority wireless communication mediums that actually have information to transmit and/or receive.

In an exemplary situation where the WCD functions as a slave, communication controllers within the WCD may monitor wireless signals related to a radio modem operating using a high priority wireless communication medium to determine if information intended for the WCD will follow. If no information is intended for the particular WCD, then the remaining time in the period reserved for transactions with a master device may be reallocated to a lower priority radio modem in the WCD. The process may then be repeated at the start of the next period wherein a new message may be received via the high priority wireless medium.

The priority between radio modems, in at least one embodiment of the present invention, may be determined based on a user specified order of communication for each wireless communication medium being utilized by the plurality of radio modems. Alternatively, priority may be determined based on other factors relevant to the radio modem and wireless communication medium, for example, the radio modem/wireless communication medium most appropriate to transact during the reallocated time, the radio modem/wireless communication medium least likely to conflict with other active radio modems, the radio modem/wireless communication medium most likely to complete its transaction during the reallocated time, an application level priority, etc.

DESCRIPTION OF DRAWINGS

The invention will be further understood from the following detailed description of a preferred embodiment, taken in conjunction with appended drawings, in which:

FIG. 5 discloses an operational example wherein interference occurs when utilizing multiple radio modems simultaneously within the same wireless communication device.

FIG. 7C discloses an exemplary operational description of a wireless communication device including a multiradio control system in accordance with at least one embodiment of the present invention.

FIG. 9C discloses an exemplary operational description of a wireless communication device including a distributed multiradio control system in accordance with the alternative embodiment of the present invention disclosed in FIG. 9A.

FIG. 10 discloses an exemplary information packet usable with at least one embodiment of the present invention.

FIG. 11A discloses examples of radio modem/wireless communication medium time scheduling in accordance with at least one embodiment of the present invention.

FIG. 11B discloses further examples of radio modem/wireless communication medium time scheduling in accordance with at least one embodiment of the present invention.

FIG. 12A discloses an exemplary multiradio controller and real time scheduler system usable with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
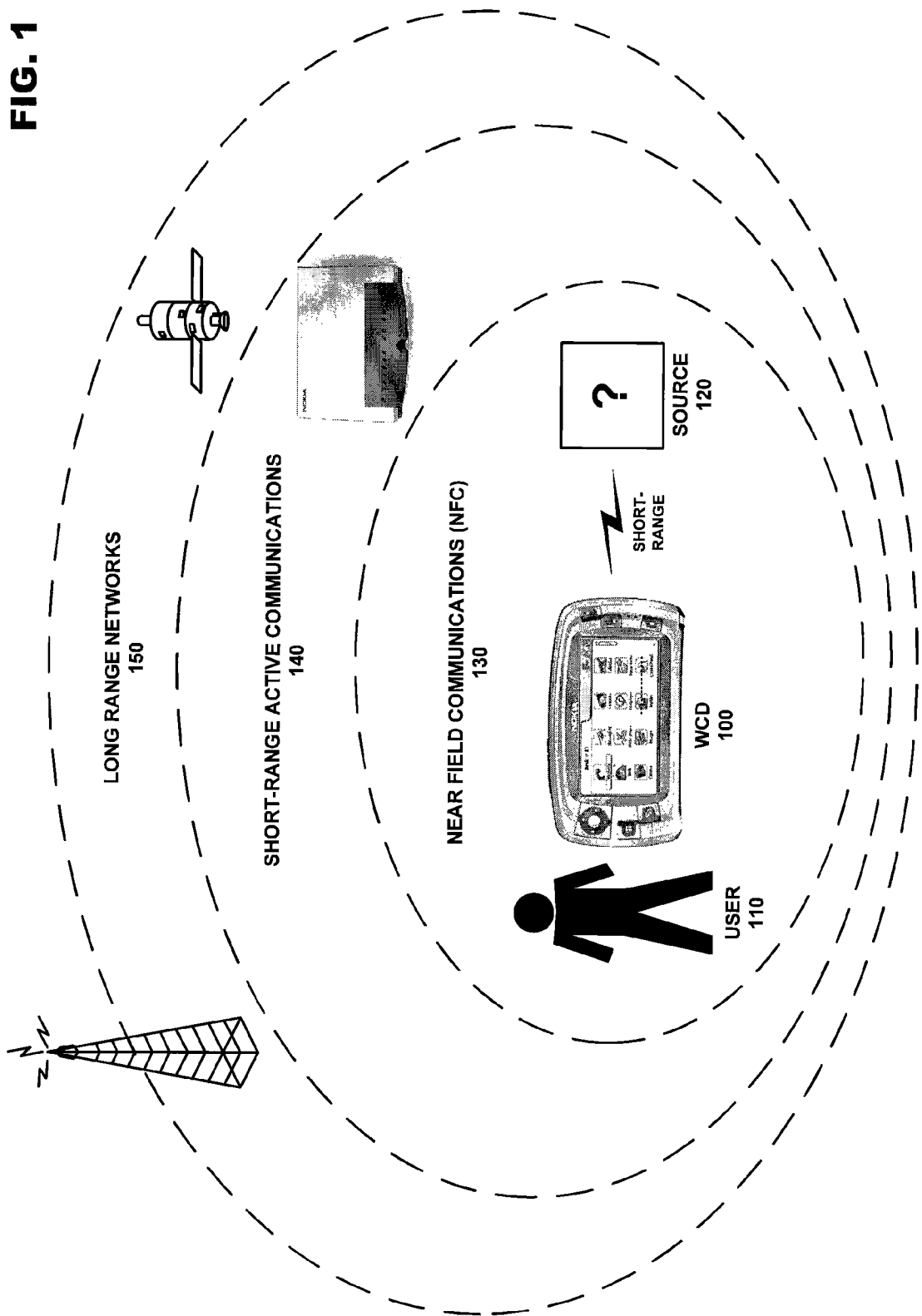
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
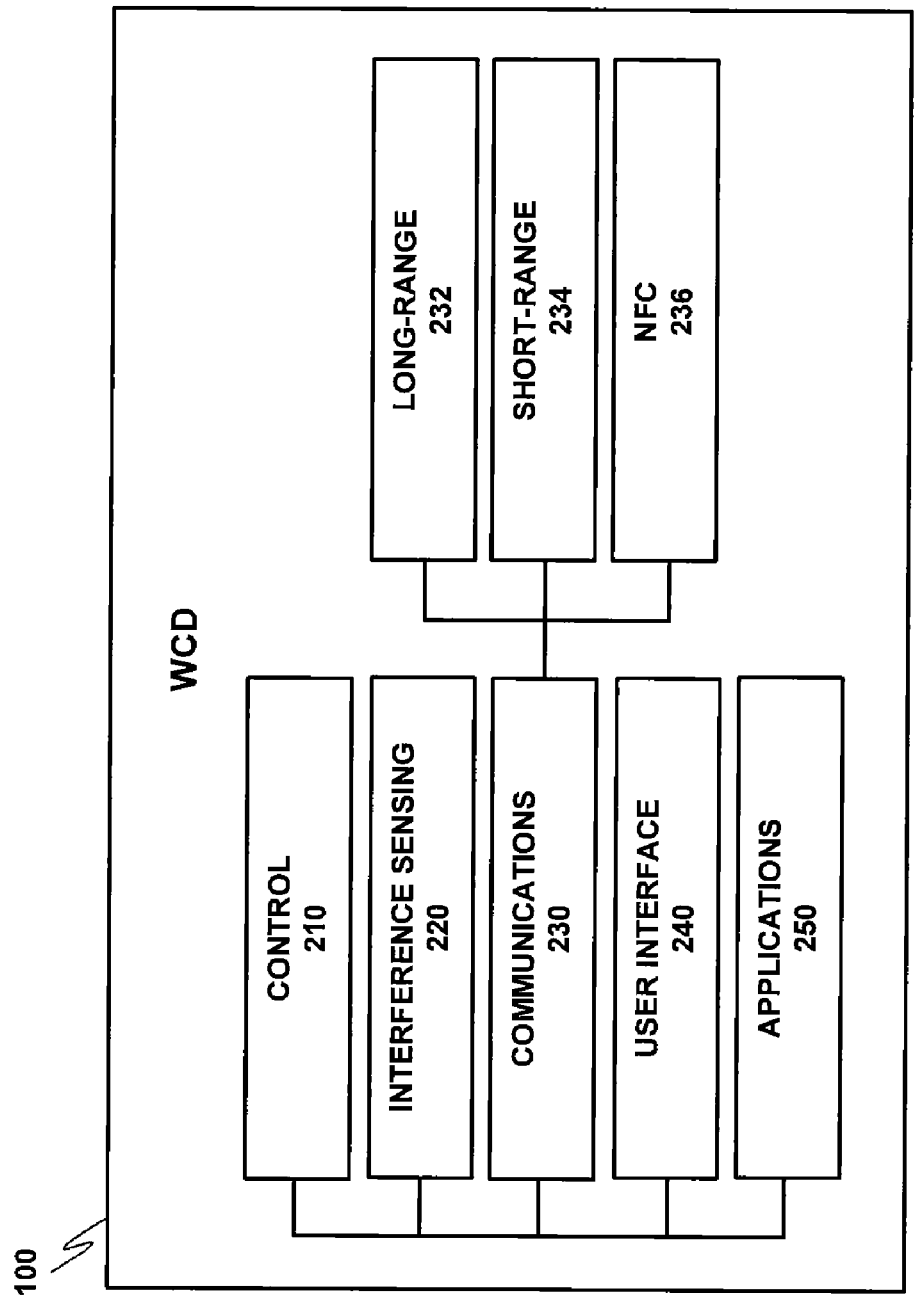
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
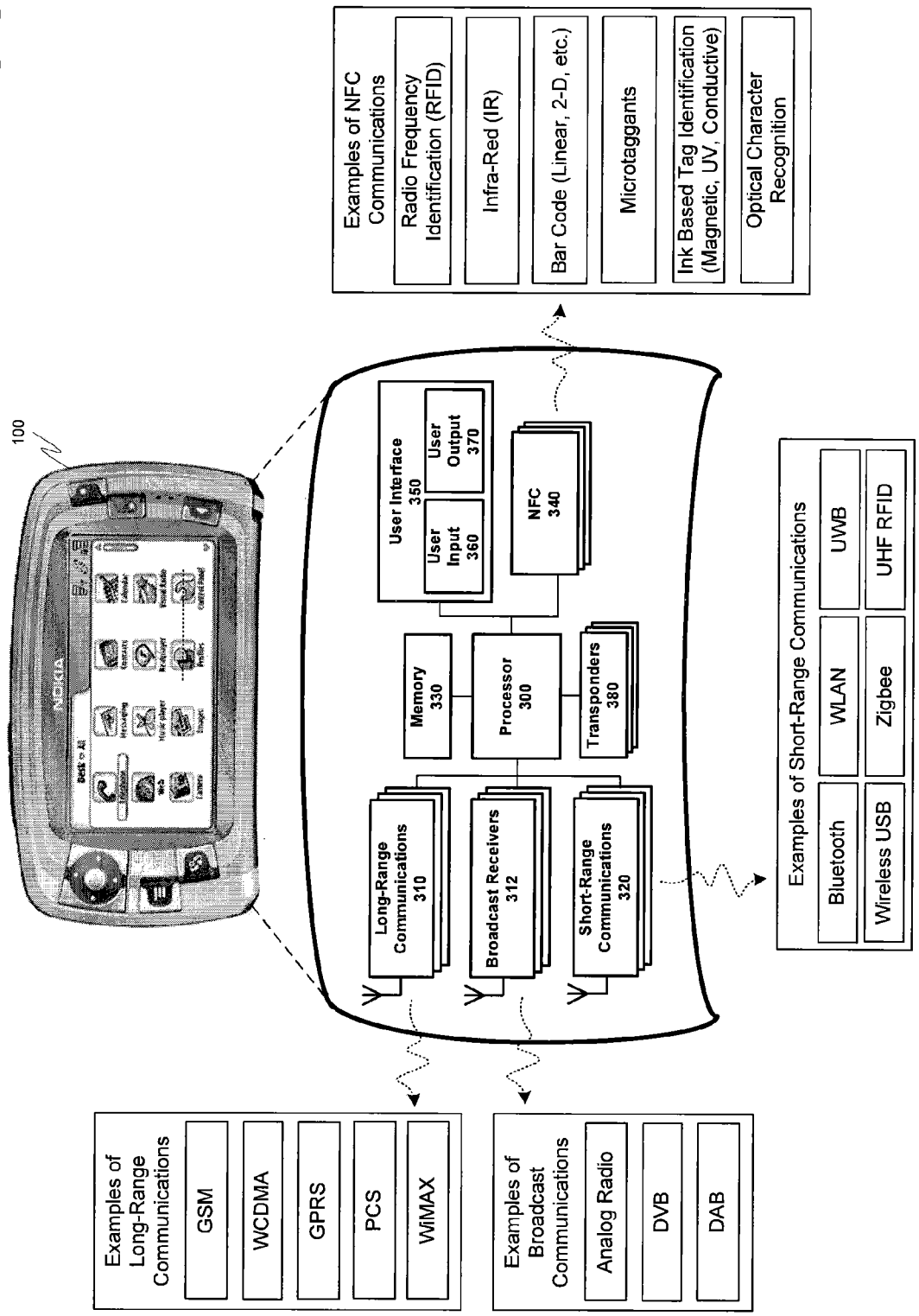
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

NFC 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
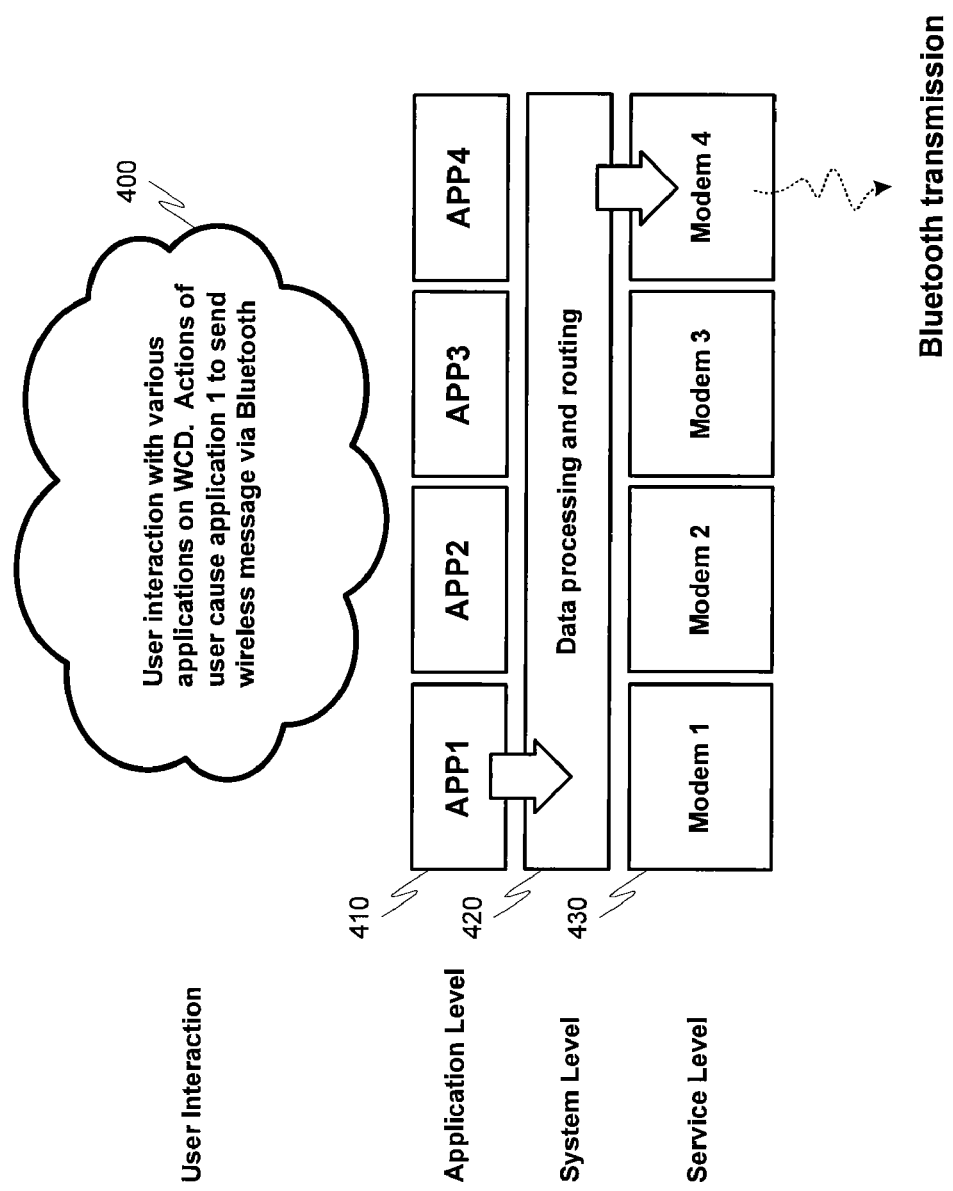
FIG. 4 discloses an exemplary operational description of a wireless communication device utilizing a wireless communication medium in accordance with at least one embodiment of the present invention.

FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
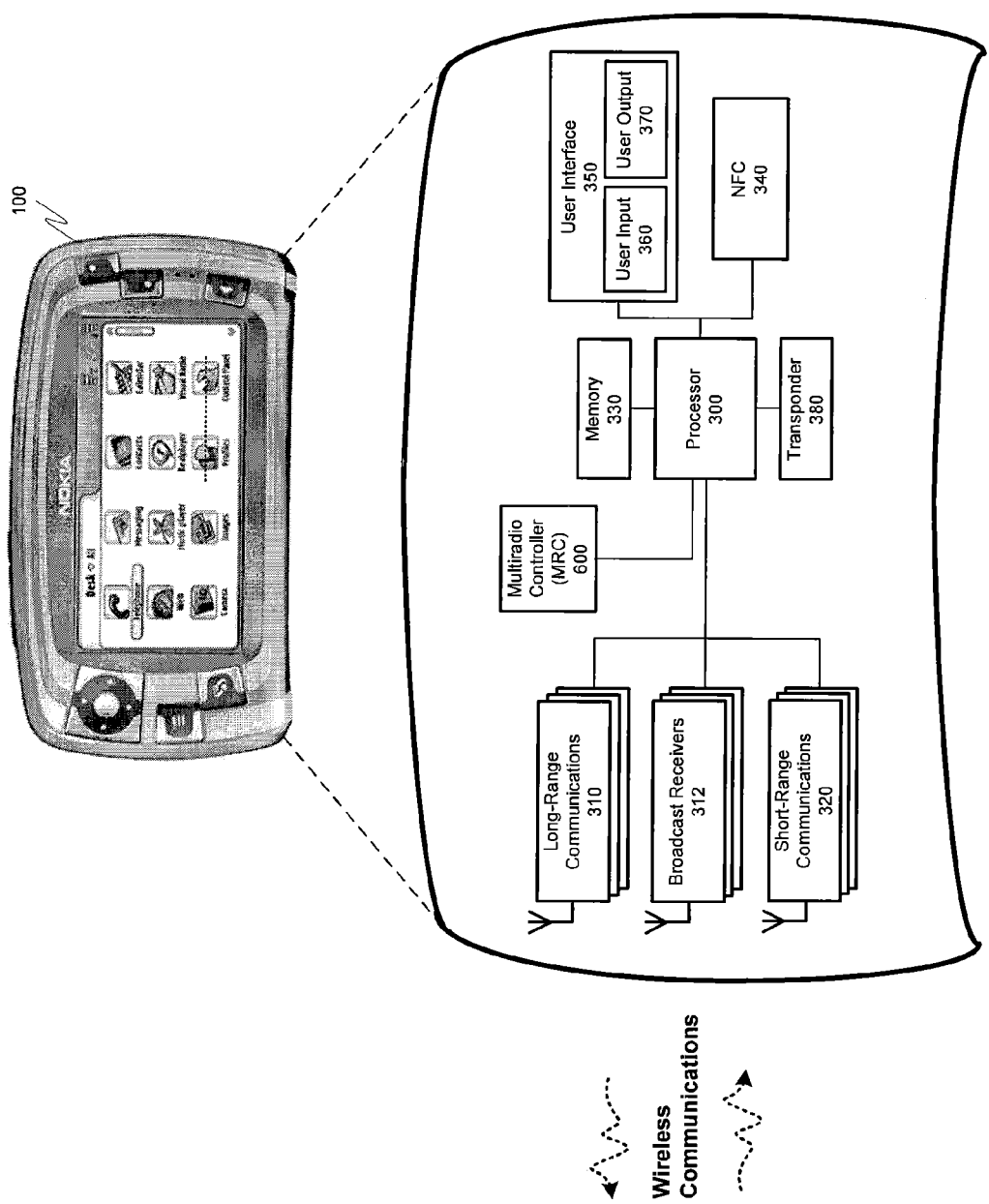
FIG. 6A discloses an exemplary structural description of a wireless communication device including a multiradio controller in accordance with at least one embodiment of the present invention.
Figure 6B:
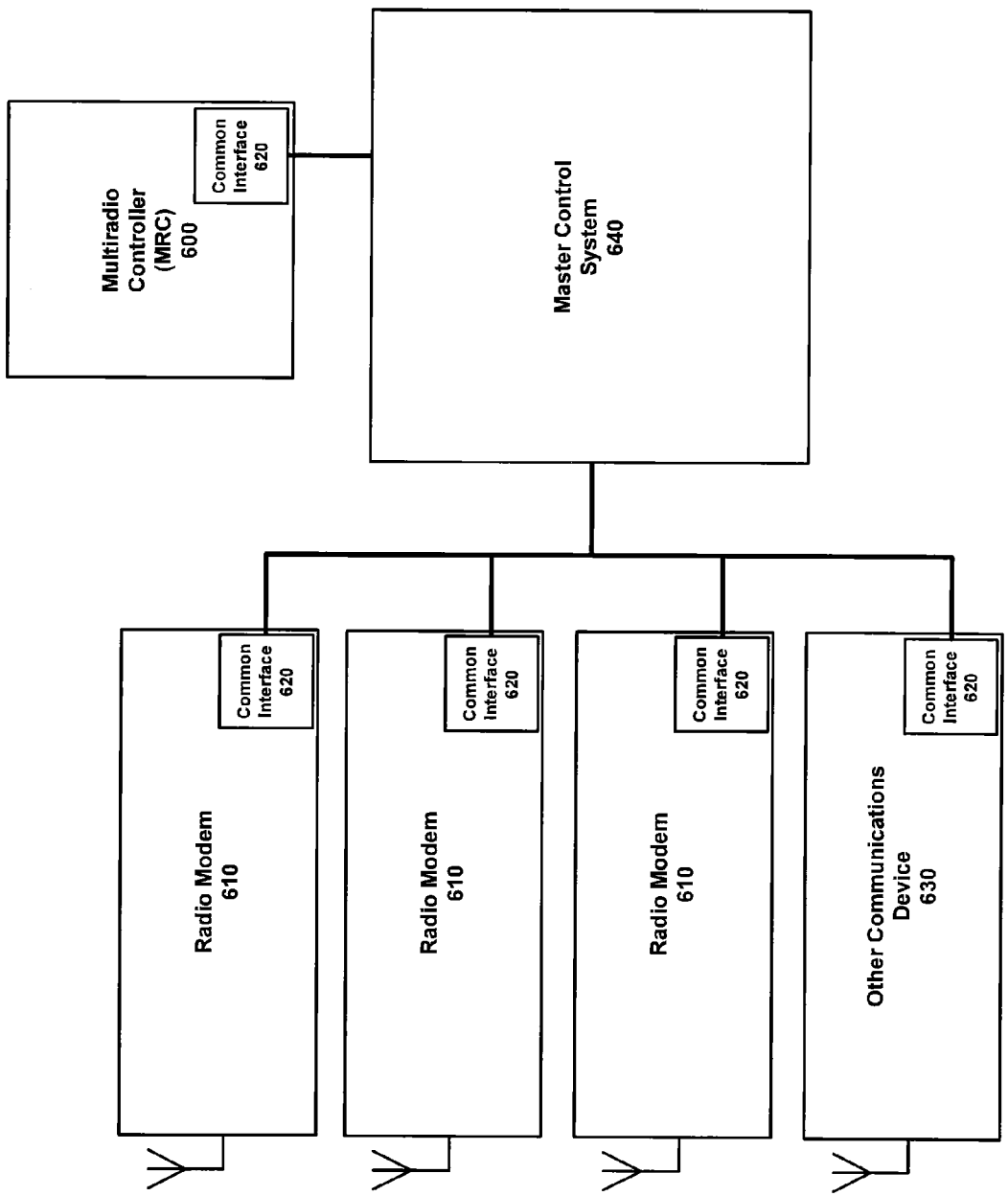
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Further, each radio modem 610 or similar communication device 630, for example an RFID scanner for scanning machine-readable information, may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
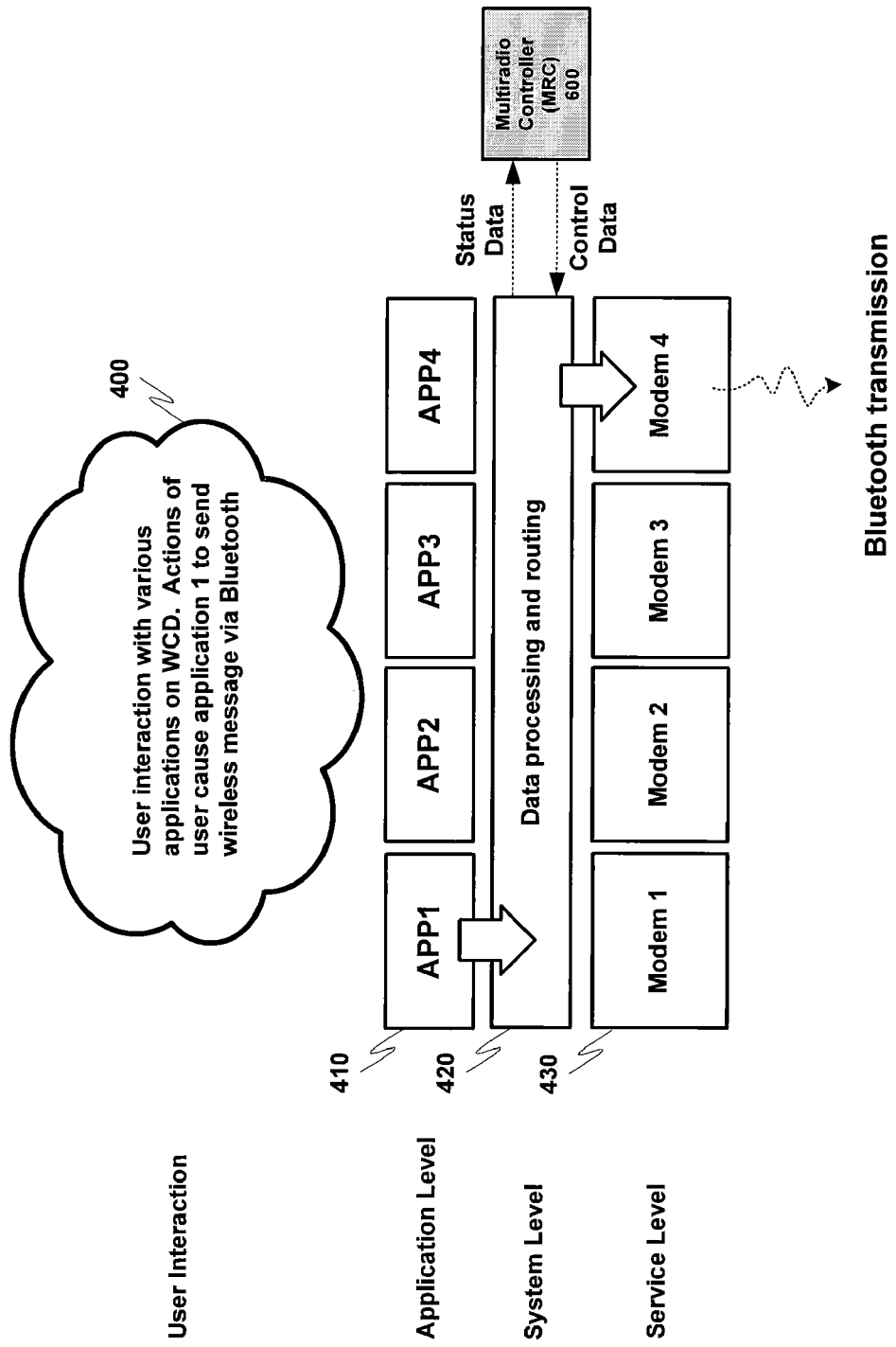
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
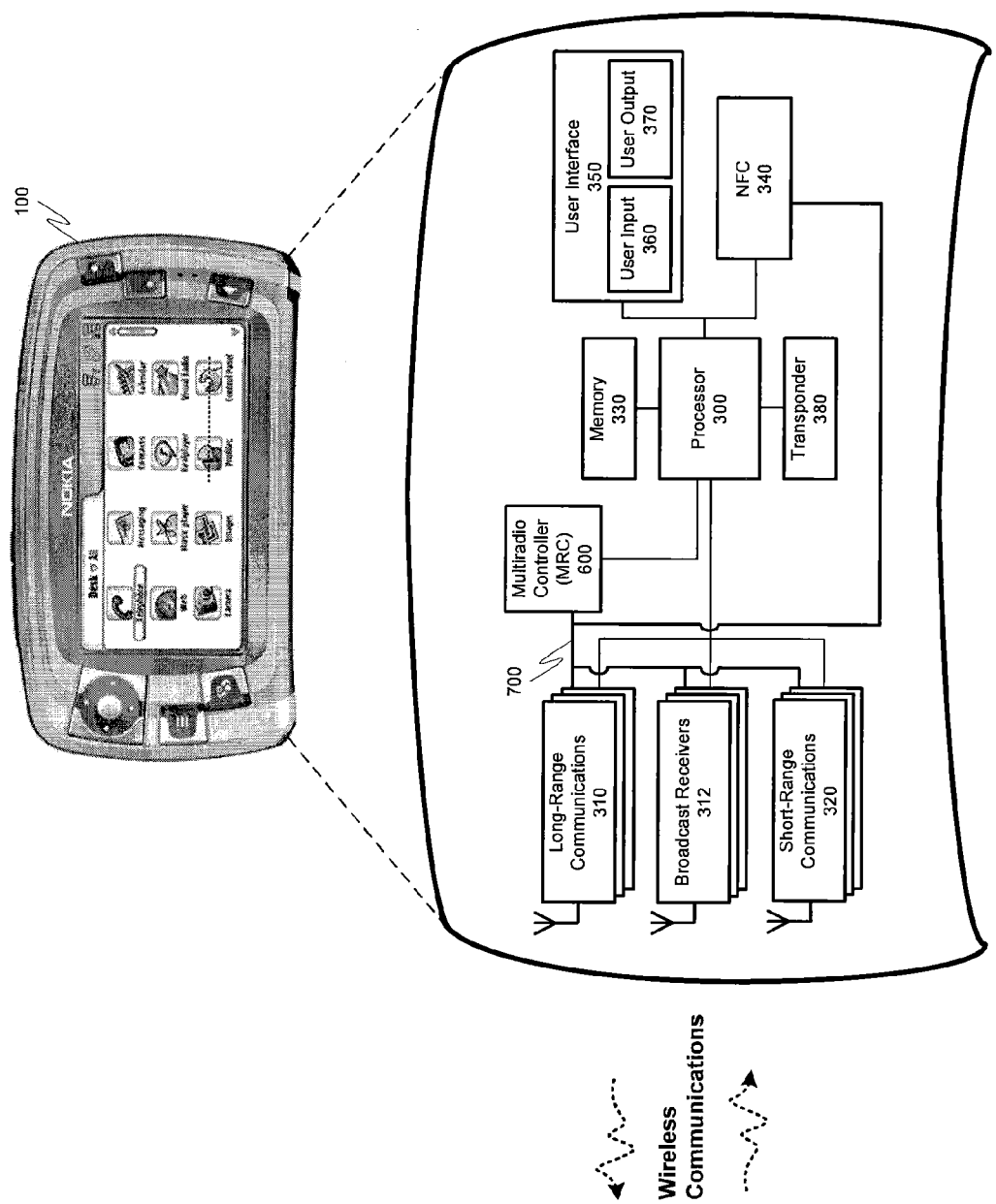
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Figure 7B:
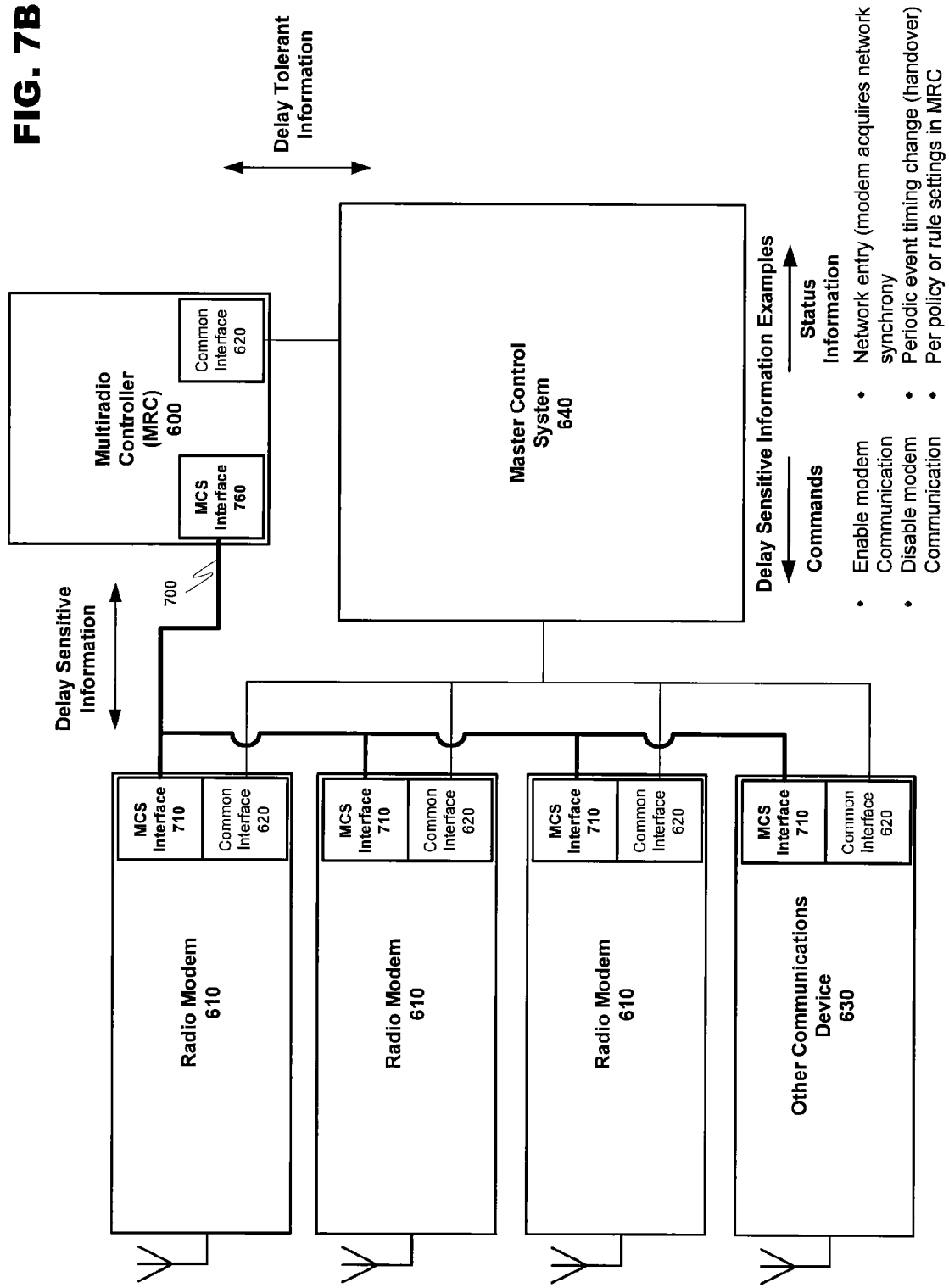
FIG. 7B discloses a more detailed structural diagram of FIG. 7A including the multiradio control system and the radio modems.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System.

Figure 8A:
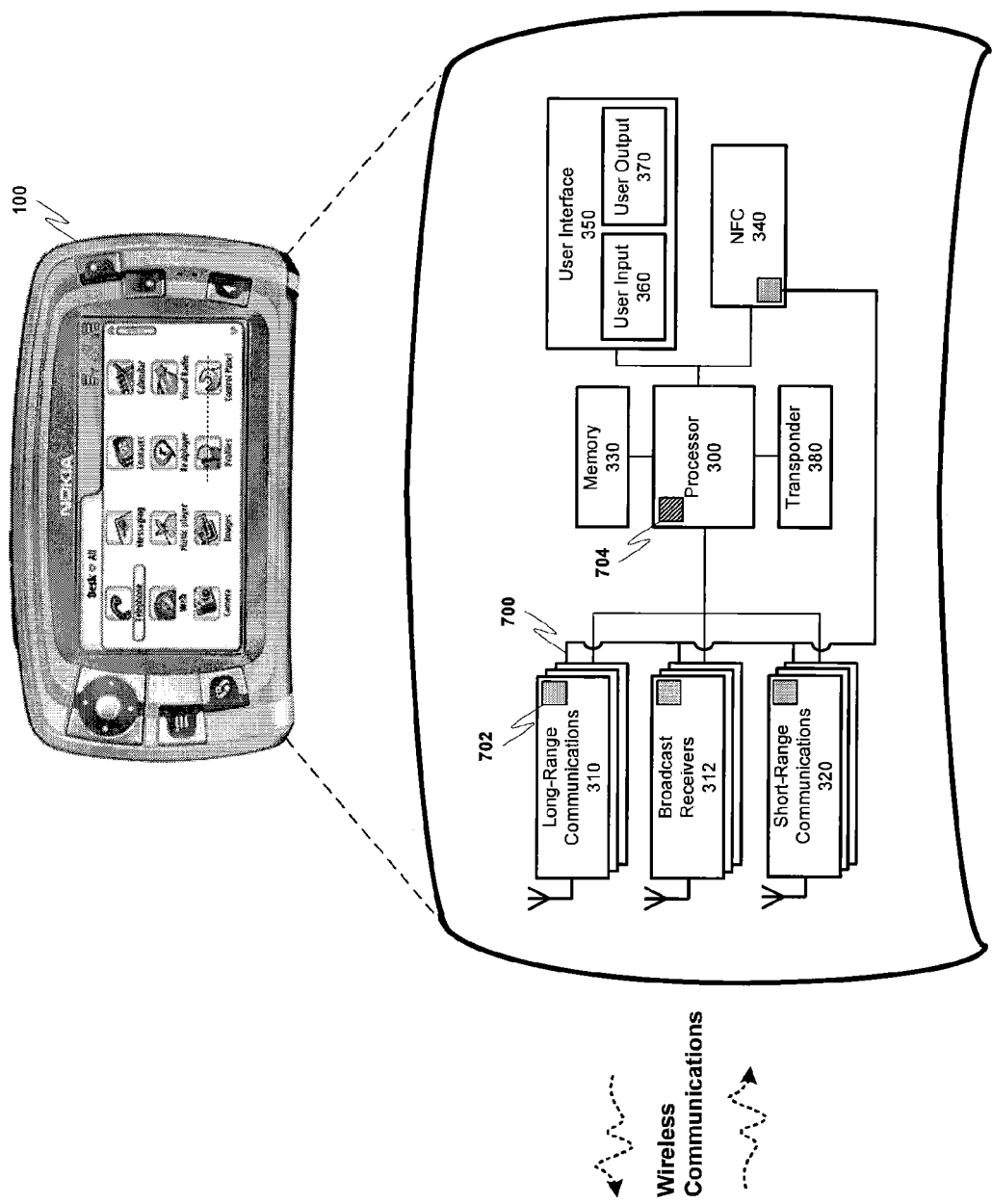
FIG. 8A discloses an exemplary structural description of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700, in this example, may be implemented utilizing a variety of bus structures, including the I$^2$C interface commonly found in portable electronic devices, as well as emerging standards such as SLIMbus that are now under development. I$^2$C is a multi-master bus, wherein multiple devices can be connected to the same bus and each one can act as a master through initiating a data transfer. An I$^2$C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I$^2$C and I$^2$S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
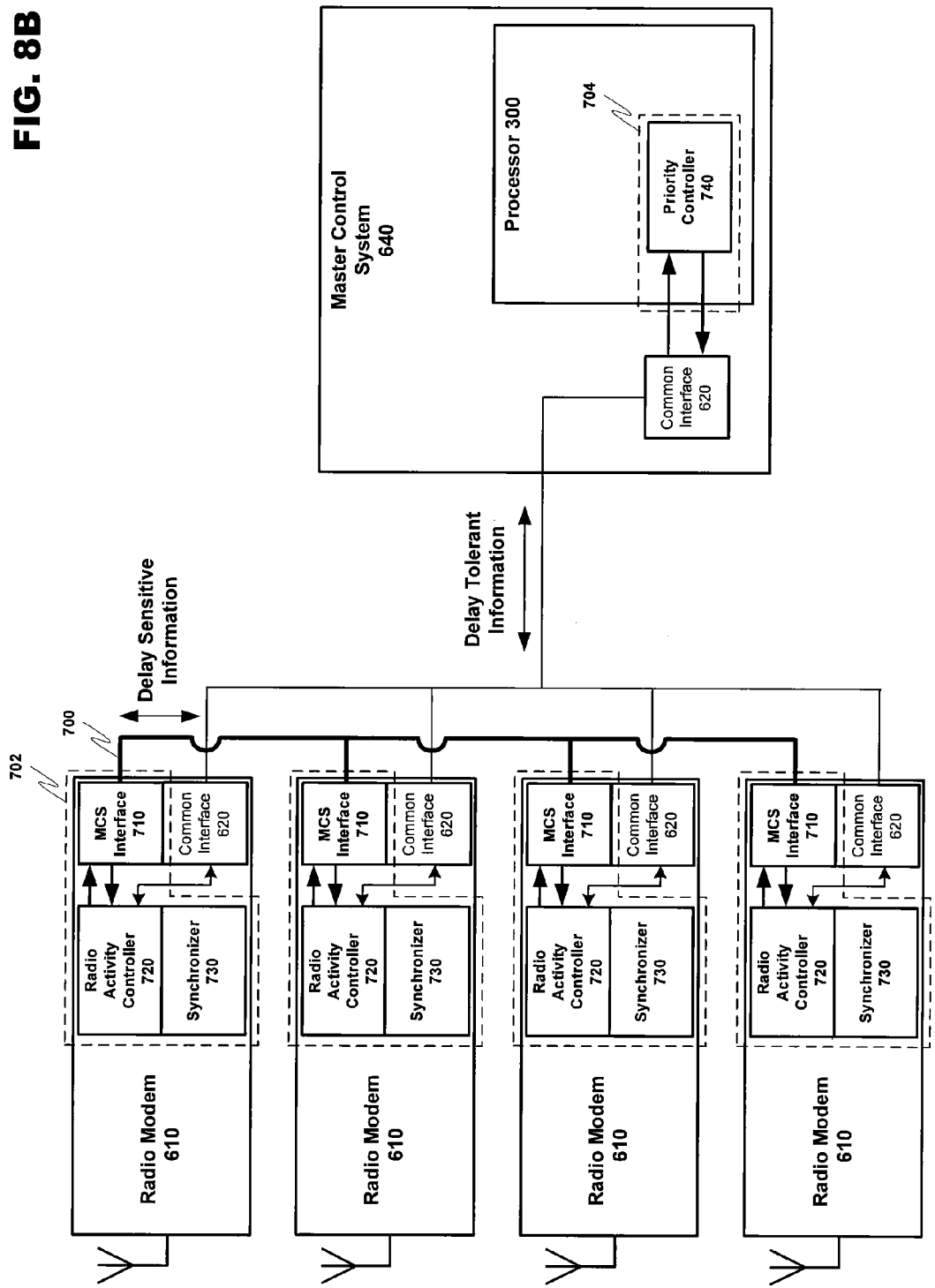
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 720 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
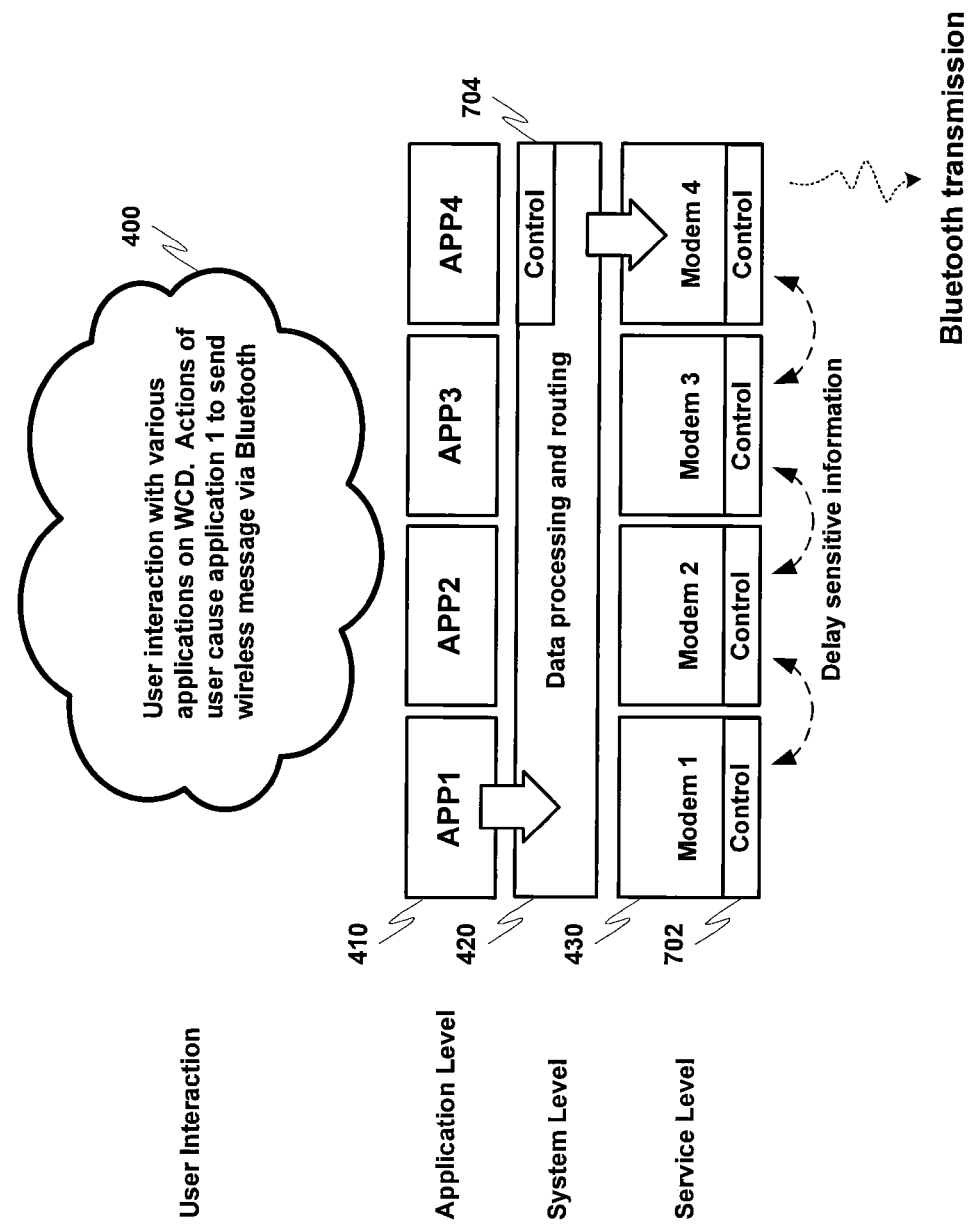
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. A Wireless Communication Device Including an Alternative Example of a Distributed Multiradio Control System.

Figure 9A:
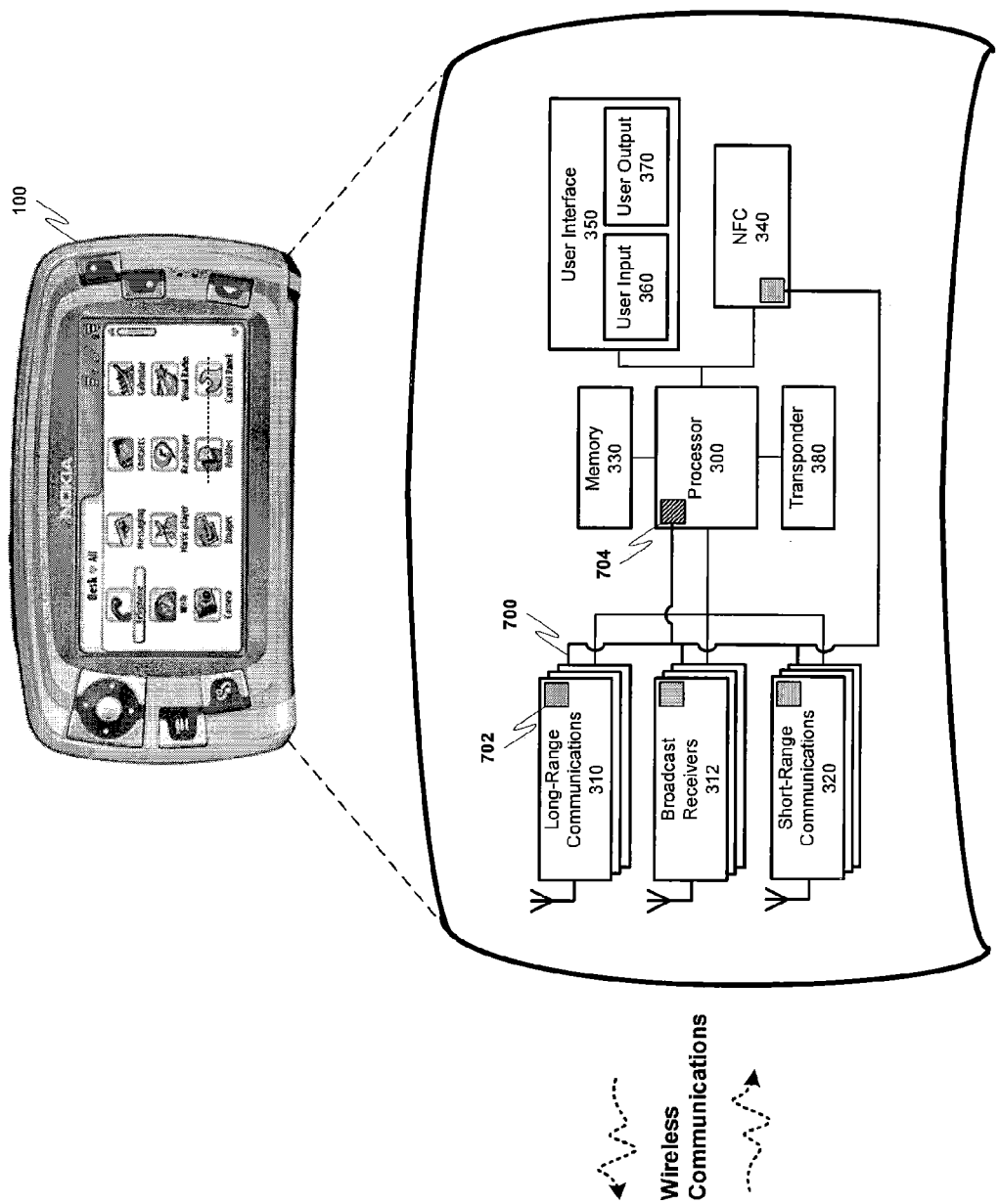
FIG. 9A discloses an exemplary structural description of a wireless communication device including a distributed multiradio control system in accordance with an alternative embodiment of the present invention.
Figure 9B:
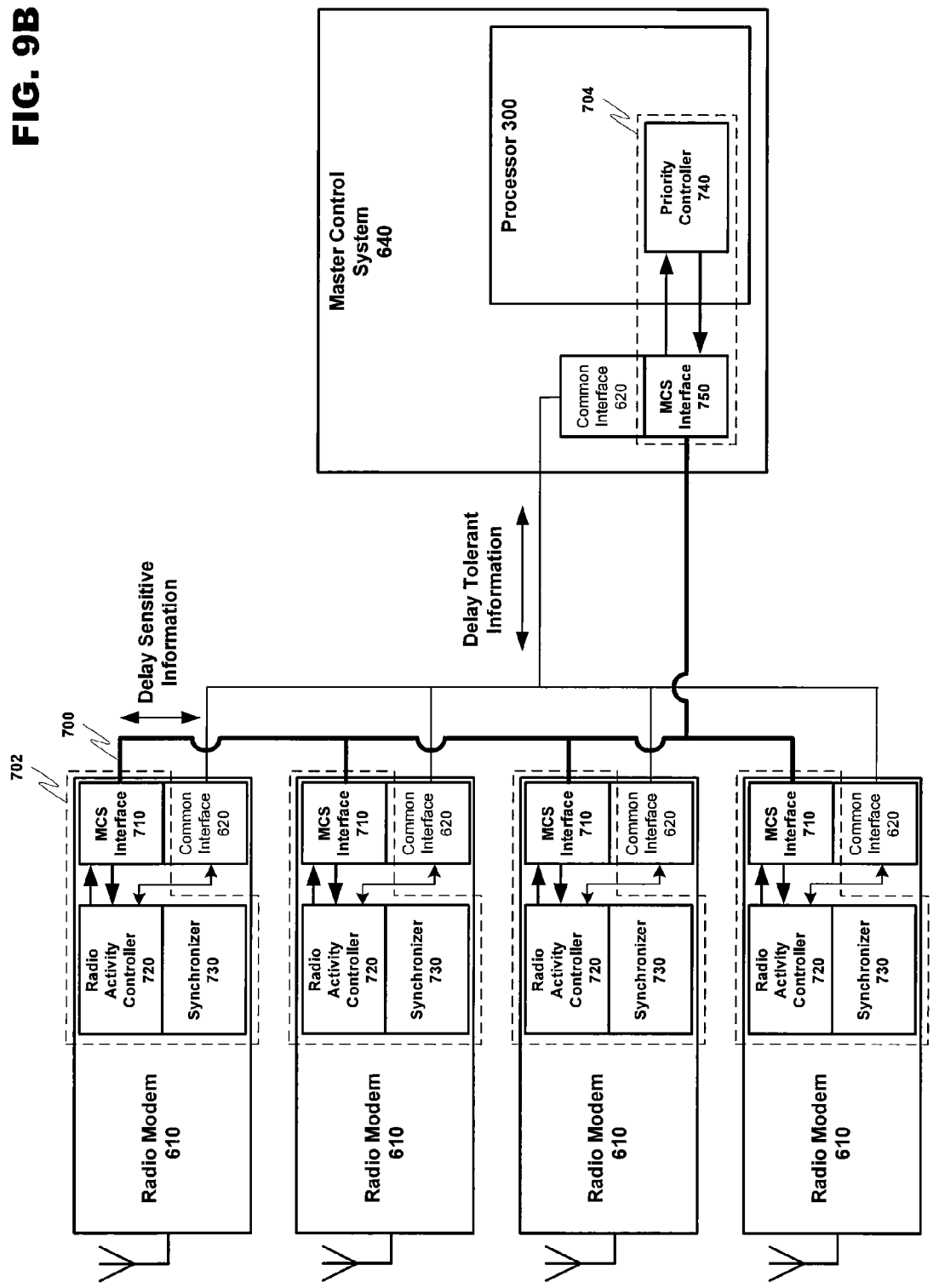
FIG. 9B discloses a more detailed structural diagram of FIG. 9A including the distributed multiradio control system and the radio modems.

An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 ...) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Time Scheduling in Wireless Communication Mediums.

FIGS. 11A and 11B discloses exemplary timing and scheduling diagrams for a wireless communication medium usable with at least one embodiment of the present invention. An example of a wireless communication medium that may reserve time in the manner disclosed in FIGS. 11A and 11B is Bluetooth™, however, the present invention is not limited exclusively to this particular medium. Two exemplary timelines for packet transmission are depicted in FIG. 11A. Bluetooth™ activity is represented by blocks with solid black shading, while WLAN activity is represented by blocks with solid white shading. Both these examples show blocks of time reserved for transmitting (TX) and receiving (RX) one or more packets between a master device and a slave device. Time reserved for Bluetooth™ is represented by blocks with upper left to lower right cross-hatched shading, while time reserved for WLAN is represented by blocks with dotted shading. In the case of Bluetooth™, packets may include three parts: an access code, a header and payload. Further, these packets may be organized into at least two classifications based on functionality. An asynchronous (packet-switched) connection between master and slave device, also called Asynchronous Connectionless Link (ACL), is created when a WCD joins a piconet as an active member. The ACL may be used to carry framed user data and Link Manager Protocol (LMP) signaling. LMP level messages, in general, may be used for the establishment and control of inter-device communication. When a slave device receives an ACL packet from a master, it must acknowledge the packet in the next slave slot. After the initial link is established between master and slave devices, Synchronous Connection Oriented (SCO) communication may then occur. A SCO link is a circuit-switched connection for reserved bandwidth communications (e.g., voice information). SCO packets will not include a cyclic redundancy check (CRC) and are never retransmitted. However, this is not the case with extended SCO (eSCO) packets that are able to be retransmitted. (e)SCO links can only be established after an ACL link has been already established, because (e)SCO link is established by using LMP signaling.

In the examples pictured in FIGS. 11A and B, the Bluetooth™ connection 1104 begins with the creation of an ACL link (not pictured) to support link management. An (e)SCO link may then be established over the ACL connection. In view of this initial requirement for an ACL connection, the slave has to listen to time periods between (e)SCO packets to find out if there is any updated ACL data being transmitted from master to slave. It is also possible to set up this ACL link to operate in "sniff" mode to reduce the necessary amount of master and slave activity. Operating using a coordinated sniff mode may result in a power savings in both master and slave, since these devices will only be actively communicating during a planned period when transactions are allowed (or expected) to occur.

It is important to note that a master device, in at least the case of Bluetooth™, may communicate to one or more slaves simultaneously. As a result, a slave must receive and interpret the header of any polling packet in order to determine if the information being advertised is directed to the particular slave. For example, to detect the poll activity it is enough to find out if there is access code present. If this information does pertain to slave, it will respond accordingly to the master. Further, if sniff subrating is supported, the slave device does not have to listen & respond to every sniff poll. In the disclosed example, the master device has no additional information to send to the client during the next sniff period. Since the slave device does not know the full extent of any information to be transmitted from the master device, and because MRC 600 schedules this time for Bluetooth™, the slave maintains preparedness in a active mode until the predefined time has elapsed.

A problem created by the previously described situation is seen in the shaded timing bars beneath the scheduling diagram in example 1100. In this example, black bars 1106 in the timing diagram represent time wherein Bluetooth™ communication occupies the available bandwidth. The time not occupied by Bluetooth™ communication may be used for other lower priority wireless communication mediums. For example, grey bars 1108 depict time that may be used for communication via WLAN 1110 (a wireless medium that may normally conflict with Bluetooth™ if communicating concurrently). As shown in example 1100, the time is predominantly reserved for Bluetooth™ 1104, which leaves little time for WLAN communication 1110. This occurs because even between reserved eSCO slots where there is no actual eSCO information to transmit from the master device to the slave device, the communication controller, such as MRC 600, reserves time for additional communication in the event an eSCO transaction may occur (e.g., retransmissions). As a result, an unnecessary allocation of time occurs in cases where Bluetooth™ is enabled but not being actively used.

The second example 1102 located on the bottom of FIG. 11A depicts a beneficial effect of at least one embodiment of the present invention. In this example, the communication controller identifies when time scheduled for Bluetooth™ communication 1104 is not actually being used, and may reallocate this reserved but unused time to other radio modems 610 utilizing lower priority wireless communication mediums (such as WLAN 1110). The eSCO period is similar to the previous example except that in this case the communication controller is enabled to identify when no actual eSCO retransmission will occur during the period (e.g., no packet was received by the client during a time when receiving (RX) was enabled), and therefore, may reallocate the unused bandwidth to a radio modem 610 engaged in WLAN communication 1110.

FIG. 11B discloses another exemplary communication scenario 1112, wherein Bluetooth™ 1104 is utilizing eSCO links. The shading conventions used in FIG. 11B are the same as previously set forth with respect to FIG. 11A. Scenario 1112 and 1114 further include an example of an ACL link in Sniff mode. Depending on the Sniff setup, the polling period could reserve several BT 1104 slots, even if there is no polling activity. Similar to FIG. 11A, scenario 1114 shows an example where reserved but unused time may be rescheduled (e.g., for WLAN 1110).

MRC 600 may work in conjunction with other hardware and/or software resources in WCD 100 in order to implement dynamic bandwidth conservation. FIG. 12A discloses exemplary functional aspects in accordance with at least one embodiment of the present invention. MRC 600 may be composed of, or alternatively may be coupled to, real time scheduler (RTS) 1200. RTS 1200 may receive calculated scheduling information from MRC 600 intended for scheduling communication for one or more radio modems 610 in WCD 100, and activity information from radio modems 610. The activity information may be used by RTS 1200 to further modify the original calculated scheduling information before the schedule information is conveyed via MCS 700, or common interface system 620, to radio modems 610.

RTS 1200 may include at least a control reschedule module 1202, an activity monitor 1204, and various interface modules for wireless communication mediums usable by WCD 100. In this example, a WLAN module 1206 and a Bluetooth™ module 1208 are shown. As previously indicated, these modules may be implemented using a combination of hardware and/or software resources. Further, in the distributed implementation of the present invention (for example, as depicted in FIG. 8A-8C or FIG. 9A-9C), the aforementioned control modules of RTS 1200 may be distributed amongst some or all of the distributed control components. Information may be received in RTS 1200 both from MRC 600 and from the various radio modems 610 in WCD 100. The information received from MRC 600 may include calculated scheduling information for radio modems 610. Of course, this scheduling may only be based on information available internal to WCD 100. On the other hand, information provided through communication interfaces, such as WLAN module 1206 and a Bluetooth™ module 1208, may include requests from other wireless communication devices proximate to WCD 100 that wish to transmit information to WCD 100 in a master/slave relationship. Information from both of these resources may be conveyed to control reschedule module 1202, for example through activity monitor module 1204, and eventually to MRC 600. Control reschedule module 1202 may use this information to further alter the operational schedule provided by MRC 600. For example, in accordance with the previous examples in FIGS. 11A and 11B, control reschedule module 1202 may determine from information received from MRC 600 when BT & WLAN devices in WCD 100 are scheduled to operate and also for example the instants when BT schedule can be rescheduled by the control reschedule module 1202, if needed. All of this information may then be used to revise the operational schedule provided by MRC 600 to reallocate scheduled time that will not actually be used for Bluetooth™ communication to other lower priority wireless communication mediums. The schedule revised by RTS 1202 may then be transmitted to radio modems 610 through MCS 700 or common interface system 620.

The prioritization of wireless communication mediums to receive available bandwidth may be determined based on a multitude of factors. Control derived from application level 410 or system level 420 may determine prioritization that information is to be transmitted or received via a wireless communication medium. For example, a voice or multimedia application may make a request for any available bandwidth. Alternatively, information related to the appropriateness or readiness of a radio modem 610 to use available bandwidth may be taken alone or considered with other factors when assigning priority. Relevant factors may include the estimated duration of a wireless transaction, the speed of a wireless communication medium, the signal strength of a wireless communication medium, the amount of available bandwidth to reallocate, the message queue for each radio modem 610, etc. Alternatively, the priority of various wireless communication mediums usable by WCD 100 may be determined by a manually selected order established by user 110.

Figure 12B:
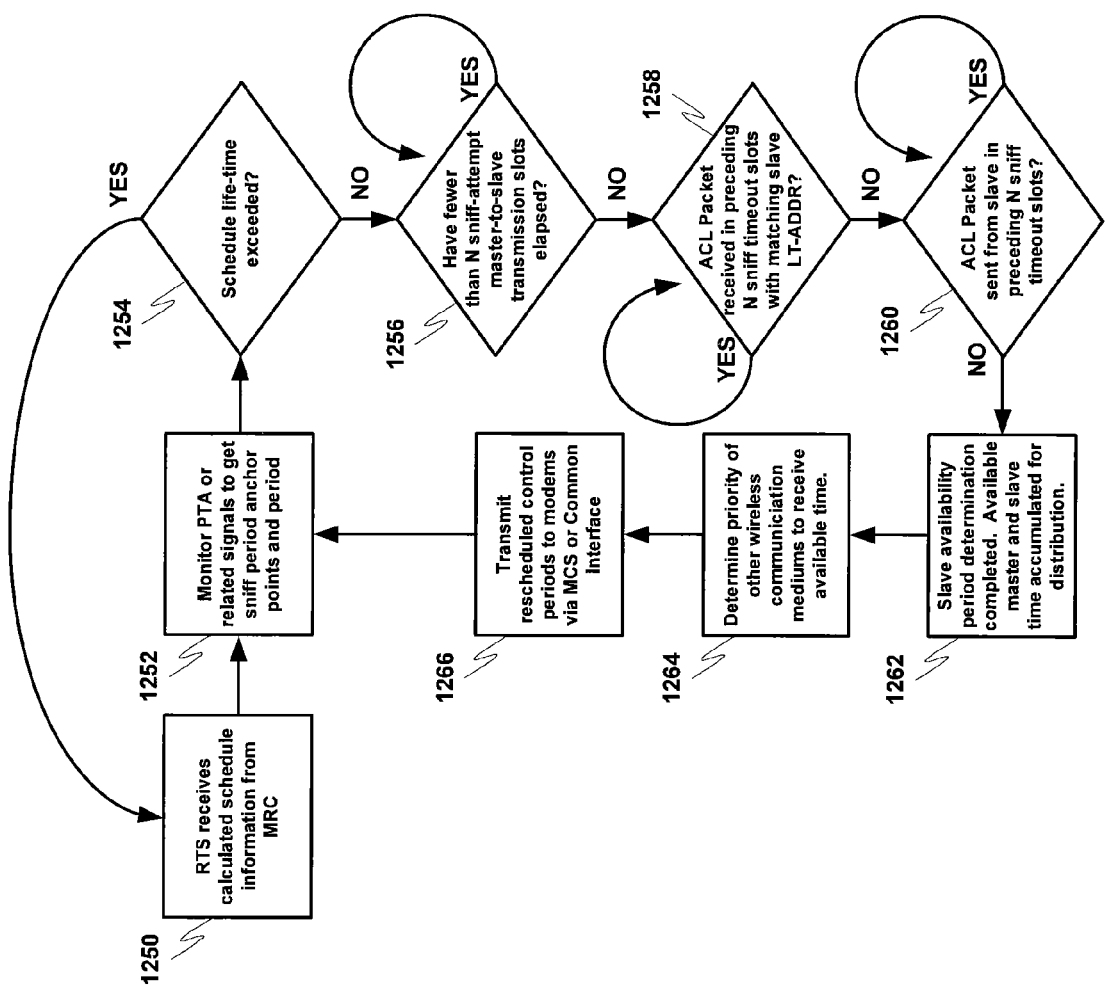
FIG. 12B discloses a flowchart explaining an exemplary process by which the present invention may determine time that may be reallocated in accordance with at least one embodiment of an instant invention.

FIG. 12B discloses a process for determining and accumulating scheduled time that will actually go unused in accordance with at least one embodiment of the present invention. In step 1250, RTS 1200 receives calculated schedule information from MRC 600 for managing radio modems 610 in WCD 100. This information is then processed by RTS 1200 to determine if there is any time scheduled by MRC 600 that will go unused, for example, where MRC 600 may have been reserved time for BT communication, but in actuality, the time will not be used.

In 1252 the periodic sniff signal may be monitored in order to determine if another device, acting as a BT master device, is attempting to transmit to WCD 100. In at least one implementation of the present invention, this information may be acquired by monitoring packet traffic arbitration (PTA) signals. Alternatively, it is also possible that this information may be available from an upper layer of the Bluetooth™ protocol stack. Once an anchor point (e.g., a synchronization point) and a sniff period are established, activity monitor 1204 may monitor incoming packet traffic during the sniff period to determine when Sniff polling packets are received.

In steps 1254-1260, a conditional determination is then made as to whether reserved time may be surrendered to other lower priority communication mediums due to this time not actually being utilized by the high priority medium (e.g., Bluetooth™). In step 1254, a predetermined schedule life-time is checked. The predetermined schedule life-time may be set by any of the aforementioned control elements (e.g., MRC 600 and/or RTS 1200). If the predetermined schedule life-time has expired, then the process may restart at 1250. Otherwise, in step 1256 the number of Sniff-attempt master-to-slave transmission slots is checked to determine if it is below a predetermined limit N. Exceeding the predetermined limit may indicate that there is no activity in the high priority medium. The determination may continue in step 1256 until the predetermined limit is met and/or exceeded. At this point the process may continue to step 1258. If a packet is received in the preceding N sniff timeout slots, then in step 1258 a determination takes place to establish whether the destination and content of the packet pertain to the particular slave device. If the packet's LT-ADDR matches the slave's address, and the packet includes ACL data, then the conditional determination may hold at step 1258 until no packets have been received with the criteria set forth. Then, under a third criteria shown in step 1260, the process may continue to determine if the slave has sent a packet in the preceding N sniff timeout slots, and the packet included ACL information. When a no ACL packets have been sent in the preceding N sniff timeout slots, then the process may continue to step 1262.

If none of the previously set forth conditions of steps 1254-1260 are met, then in step 1262 a slave availability period determination is completed, and the unused reserved time may be accumulated with any unused bandwidth information received from MRC 600 in step 1250 to determine a total available time to reallocate to other lower priority wireless communication mediums. MRC 600 and/or RTS 1200 may then make a determination as to how to reallocate the available bandwidth in step 1264 based on a priority level between radio modems and/or communication mediums as previously described. This information may then be used to create altered schedules for radio modems 610 (step 1266). The process may then resume at step 1252 in order to provide continuous communication control.

The present invention is an improvement over the state of the art at least in the disclosed ability not only to manage a plurality of radio modems utilizing possibly conflicting wireless communication mediums in the same wireless communication device, but also in the additional benefit of conserving transmission time so that lower priority radio modems may be provided additional communication time. This behavior may further enhance the usability of a wireless communication device in that different wireless communication mediums may co-exist in the same device with increased efficiency, and as a result, increased benefit from the device.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed:
1. A method, comprising:
receiving operational schedule information at a radio modem configured to communicate using a first wireless communication medium;
synchronizing the radio modem to periodic operation for the first wireless communication medium by monitoring packet traffic arbitration (PTA) signals to determine an anchor point and a periodic sniff interval for the first radio modem;

if the schedule information is determined to be valid, identifying periods of time defined by the schedule information wherein the radio modem is scheduled to be active during the periodic operation of the first wireless communication medium;

monitoring communication activity during the identified periods of time to determine if one or more received message threshold conditions comprising at least receiving a predetermined number of polling messages have been realized;

if the one or more received message threshold conditions have been realized, determining if messages await transmission from the radio modem; and if no messages await transmission, reallocating an unused portion of the one or more time periods to another radio modem enabled to communicate over a second wireless communication medium, the unused portion of the scheduled time being the time remaining after the polling messages are not answered until a predefined time has elapsed.

2. The method of claim 1, wherein the first wireless communication medium is Bluetooth™ communication and the second wireless communication medium is Wireless Local Area Network (WLAN) communication.

3. The method of claim 1, wherein the identified periods may not be reallocated when the polling messages are received.

4. The method of claim 1, wherein the operational schedule information is received from a multiradio control device and signals related to the first radio modem.

5. The method of claim 1, wherein the other radio modem is determined based on at least one of an importance level of communication to be transacted or on a suitability to transmit during the scheduled time.

6. A device, comprising:
a plurality of radio modems;
at least one processor; and
at least one memory including executable instructions, the at least one memory and the executable instructions being configured to, in cooperation with the at least one processor, cause the device to perform at least the following:
receive operational schedule information at a radio modem configured to communicate using a first wireless communication medium;
synchronize the radio modem to periodic operation for the first wireless communication medium by monitoring packet traffic arbitration (PTA) signals to determine an anchor point and a periodic sniff interval for the first radio modem;
if the schedule information is determined to be valid, identify periods of time defined by the schedule information wherein the radio modem is scheduled to be active during the periodic operation of the first wireless communication medium;
monitor communication activity during the identified periods of time to determine if one or more received message threshold conditions comprising at least receiving a predetermined number of polling messages have been realized;
if the one or more received message threshold conditions have been realized, determine if messages await transmission from the radio modem; and if no messages await transmission, reallocate an unused portion of the one or more time periods to another radio modem enabled to communicate over a second wireless communication medium, the unused portion of the scheduled time being the time remaining after the polling messages are not answered until a predefined time has elapsed.

7. The device of claim 6, wherein the first wireless communication medium is Bluetooth™ communication and the second wireless communication medium is Wireless Local Area Network (WLAN) communication.

8. The device of claim 6, wherein the identified periods may not be reallocated when the polling messages are received.

9. The device of claim 6, wherein the operational schedule information is received from a multiradio control device and signals related to the first radio modem.

10. The device of claim 6, wherein the other radio modem is determined based on at least one of an importance level of communication to be transacted or on a suitability to transmit during the scheduled time.

11. A computer program product comprising computer executable program code recorded on a computer readable storage medium, the computer executable program code comprising:
code configured to receive operational schedule information at a radio modem configured to communicate using a first wireless communication medium;
code configured to synchronize the radio modem to periodic operation for the first wireless communication medium by monitoring packet traffic arbitration (PTA) signals to determine an anchor point and a periodic sniff interval for the first radio modem;
code configured to, if the schedule information is determined to be valid, identify periods of time defined by the schedule information wherein the radio modem is scheduled to be active during the periodic operation of the first wireless communication medium;
code configured to monitor communication activity during the identified periods of time to determine if one or more received message threshold conditions comprising at least receiving a predetermined number of polling messages have been realized;
code configured to, if the one or more received message threshold conditions have been realized, determine if messages await transmission from the radio modem; and
code configured to, if no messages await transmission, reallocate an unused portion of the one or more time periods to another radio modem enabled to communicate over a second wireless communication medium, the unused portion of the scheduled time being the time remaining after the polling messages are not answered until a predefined time has elapsed.

12. The computer program product of claim 11, wherein the first wireless communication medium is Bluetooth™ communication and the second wireless communication medium is Wireless Local Area Network (WLAN) communication.

13. The computer program product of claim 11, wherein the identified periods may not be reallocated when the polling messages are received.

14. The computer program product of claim 11, wherein the operational schedule information is received from a multiradio control device and signals related to the first radio modem.

15. The computer program product of claim 11, wherein a the other radio modem is determined based on at least one of an importance level of communication to be transacted or on a suitability to transmit during the scheduled time.

16. A multiradio control module, comprising:
at least one interface module for communicating via wired or wireless communication with at least a plurality of radio modems; and
at least one control module for executing process steps, including:
receiving operational schedule information at a radio modem configured to communicate using a first wireless communication medium;
synchronizing the radio modem to periodic operation for the first wireless communication medium by monitoring packet traffic arbitration (PTA) signals to determine an anchor point and a periodic sniff interval for the first radio modem;
if the schedule information is determined to be valid, identifying periods of time defined by the schedule information wherein the radio modem is scheduled to be active during the periodic operation of the first wireless communication medium;
monitoring communication activity during the identified periods of time to determine if one or more received message threshold conditions comprising at least receiving a predetermined number of polling messages have been realized;
if the one or more received message threshold conditions have been realized, determining if messages await transmission from the radio modem; and
if no messages await transmission, reallocating an unused portion of the one or more time periods to another radio modem enabled to communicate over a second wireless communication medium, the unused portion of the scheduled time being the time remaining after the polling messages are not answered until a predefined time has elapsed.

17. The multiradio control module of claim 16, wherein the first wireless communication medium is Bluetooth™ communication and the second wireless communication medium is Wireless Local Area Network (WLAN) communication.

18. The multiradio control module of claim 16, wherein the identified periods may not be reallocated when the polling messages are received.

19. The multiradio control module of claim 16, wherein the operational schedule information is received from a multiradio control device and signals related to the first radio modem.

20. The multiradio control module of claim 16, wherein the other radio modem is determined based on at least one of an importance level of communication to be transacted or on a suitability to transmit during the scheduled time.

* * * * *